(12) United States Patent
Jiang et al.

(10) Patent No.: US 10,538,653 B2
(45) Date of Patent: Jan. 21, 2020

(54) FLAME RETARDANT COMPOUND INCLUDING HOST-GUEST COMPLEX

(71) Applicant: CORNING OPTICAL COMMUNICATIONS LLC, Charlotte, NC (US)

(72) Inventors: Dayue Jiang, Painted Post, NY (US); Kirsten Langfeld, Berlin (DE); Brandon Robert Williamson, Johnson City, TN (US)

(73) Assignee: CORNING OPTICAL COMMUNICATIONS LLC, Charlotte, NC (US)

( * ) Notice: Subject to any disclaimer, the term of this patent is extended or adjusted under 35 U.S.C. 154(b) by 0 days.

(21) Appl. No.: 16/553,992

(22) Filed: Aug. 28, 2019

(65) Prior Publication Data

US 2019/0382565 A1    Dec. 19, 2019

Related U.S. Application Data

(60) Division of application No. 15/983,533, filed on May 18, 2018, now Pat. No. 10,428,209, which is a
(Continued)

(51) Int. Cl.
*C08L 23/06* (2006.01)
*C08L 23/08* (2006.01)
(Continued)

(52) U.S. Cl.
CPC .......... *C08L 23/06* (2013.01); *C08L 23/0853* (2013.01); *G02B 6/4436* (2013.01); *H01B 7/295* (2013.01);
(Continued)

(58) Field of Classification Search
None
See application file for complete search history.

(56) References Cited

U.S. PATENT DOCUMENTS 9,690,062 B2 * 6/2017 Hurley ................. G02B 6/4434
2003/0057406 A1 * 3/2003 Yang .................... C08K 5/0008
252/609
(Continued)

FOREIGN PATENT DOCUMENTS

CN     101967281 A     2/2011
CN     103421241 A    12/2013
(Continued)

OTHER PUBLICATIONS

Alongi et al."Cyclodextrin nanosponges as novel green flame retardants for PP, LLDPE and PA6", Carbohydrate Polymers 88(4) 2012, pp. 1387-1394.
(Continued)

*Primary Examiner* — Rhonda S Peace
(74) *Attorney, Agent, or Firm* — William D. Doyle

(57) ABSTRACT

A flame retardant compound is provided. The flame retardant compound includes a polymer base resin, a carbonific host compound, and a guest compound including at least one atom of a transition metal. The carbonific host compound and the guest compound form a host-guest complex, and the host-guest complex acts to inhibit at least one of smoke release and smoke formation when exposed to heat. The host-guest complex is distributed within the polymer base resin. An intumescent flame retardant compound is also provided. The intumescent flame retardant compound includes a base resin, an acid donor, a spumific agent, a cyclodextrin host compound, and a guest compound including at least one atom of molybdenum. The cyclodextrin host compound and the guest compound form a host-guest com-
(Continued)

plex. The acid donor, carbonific host compound, and spumific agent react when exposed to a temperature above 280° C. to form a foam.

6 Claims, 7 Drawing Sheets

Related U.S. Application Data continuation of application No. PCT/US2016/057623, filed on Oct. 19, 2016.

(60) Provisional application No. 62/256,890, filed on Nov. 18, 2015.

(51) Int. Cl.
*G02B 6/44* (2006.01)
*H01B 7/295* (2006.01)
*H01B 3/44* (2006.01)
*H01B 3/30* (2006.01)

(52) U.S. Cl.
CPC ....... *C08L 2201/02* (2013.01); *C08L 2201/08* (2013.01); *C08L 2203/202* (2013.01); *C08L 2205/03* (2013.01); *C08L 2207/066* (2013.01); *H01B 3/302* (2013.01); *H01B 3/305* (2013.01); *H01B 3/441* (2013.01); *H01B 3/443* (2013.01); *H01B 3/447* (2013.01)

(56) References Cited

U.S. PATENT DOCUMENTS

| | | | | |
|---|---|---|---|---|
| 2004/0002559 | A1* | 1/2004 | Troutman | C09D 5/185 524/100 |
| 2005/0009965 | A1* | 1/2005 | Schell | C08L 67/025 524/115 |
| 2006/0269771 | A1* | 11/2006 | Cogen | B82Y 30/00 428/560 |
| 2009/0022462 | A1* | 1/2009 | Papazoglou | C08K 3/34 385/123 |
| 2012/0224818 | A1* | 9/2012 | Karayianni | C08K 5/0066 385/100 |
| 2016/0272892 | A1* | 9/2016 | Wang | C09D 5/185 |
| 2018/0265684 | A1* | 9/2018 | Jiang | C08L 23/06 |
| 2019/0085154 | A1* | 3/2019 | Jiang | C08K 5/0066 |
| 2019/0106568 | A1* | 4/2019 | Karayianni | C08K 5/1545 |

FOREIGN PATENT DOCUMENTS

| | | |
|---|---|---|
| CN | 103435844 A | 12/2013 |
| EP | 0921174 A1 | 6/1999 |
| WO | 2015028047 A1 | 3/2015 |

OTHER PUBLICATIONS

International Search Report and Written Opinion of the International Searching Authority; PCT/US2016/057623; dated Jan. 17, 2017; 11 Pages; ISA/US Commissioner for Patents.
Ishikawa et al. "Preparation of Calix [8] arene and combustion of its blends", JP Society of Polymer Science 63(2) 2006, pp. 124-134.
Wang et al. "Cyclodextrin microencapsulated ammonium polyphosphate: preparation and its performance on the thermal, flame retardancy and mechanical properties of ethylene vinyl acetate copolymer" , Composites: Part B 69, 2014, pp. 22-30.
EP16866823.4 Office Action and Search Report dated May 17, 2019, European Patent Office, 11 Pgs.

* cited by examiner

FLAME RETARDANT COMPOUND INCLUDING HOST-GUEST COMPLEX

CROSS-REFERENCE TO RELATED APPLICATIONS

This application is a divisional of U.S. patent application Ser. No. 15/983,533, filed Oct. 19, 2016, which is continuation of International Application No. PCT/US16/57623, filed Feb. 25, 2016, which claims the benefit of priority to U.S. Application No. 62/256,890, filed Nov. 11, 2015, all applications being incorporated herein by reference.

BACKGROUND

The disclosure relates generally to flame retardant compounds and more particularly to a thermoplastic flame retardant compound. Flame retardant materials are used to protect combustible materials, such as plastics or wood, from fire damage and heat. Additionally, flame retardant materials have been used to protect materials that lose their strength when exposed to high temperatures, such as steel.

SUMMARY

A flame retardant compound is provided. The flame retardant compound includes a polymer base resin, a carbonific host compound, and a guest compound including a trace amount (e.g., at least one atom) of a transition metal. The carbonific host compound and the guest compound form a host-guest complex, and the host-guest complex acts to inhibit at least one of smoke release and smoke formation when exposed to heat. The host-guest complex is distributed within the polymer base resin.

An intumescent flame retardant compound is provided. The intumescent flame retardant compound includes a base resin, an acid donor, a spumific agent, a cyclodextrin host compound, and a guest compound including a trace amount (e.g., at least one atom) of molybdenum. The cyclodextrin host compound and the guest compound form a host-guest complex. The acid donor reacts with the carbonific host compound to produce a char when exposed to a temperature above 280° C. The spumific agent decomposes to form a blowing gas when exposed to a temperature above 280° C., and the blowing gas and the char form a foam.

A flame retardant cable is provided. The flame retardant cable includes at least one communication element and a polymeric jacket surrounds the at least one communication element. The polymeric jacket is formed from a flame retardant compound. The flame retardant compound includes a polymer base resin, a carbonific host compound, and a guest compound including a trace amount (e.g., at least one atom) of a transition metal. The carbonific host compound and the guest compound form a host-guest complex, and the host-guest complex acts to inhibit at least one of smoke release and smoke formation when exposed to heat. The host-guest complex is distributed within the polymer base resin.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Figure 1:
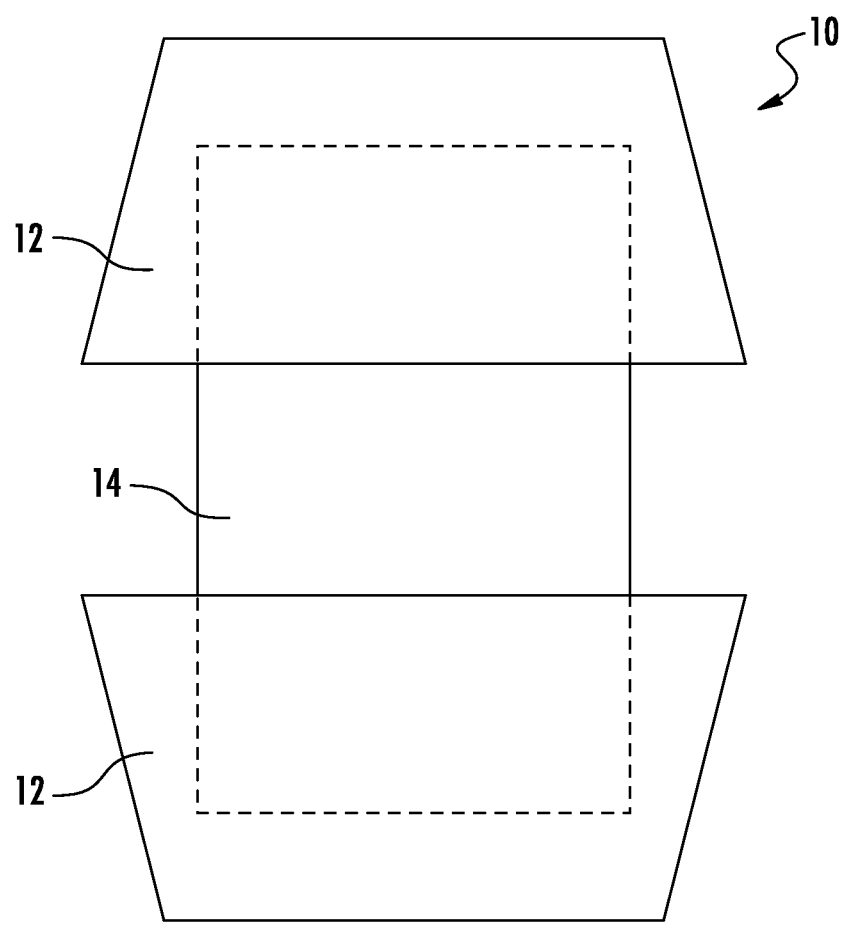
FIG. 1 depicts a schematic representation of a flame retardant host-guest complex according to an exemplary embodiment.

Referring generally to the figures, various embodiments of a flame retardant compound and its applications are shown. In general, the embodiments discussed herein relate to a thermoplastic compound comprised of a polymer, such as a polyolefin homopolymer or copolymer base resin, and a flame retardant package. The flame retardant package includes a host-guest complex in which the host is a carbonific molecule and the guest is a transition metal-containing molecule, such as a molybdenum-containing molecule. The host-guest complex is part of a flame retardant package that can be added to various thermoplastic resins to provide a thermoplastic flame retardant compound. The host and guest molecules interact physically at the molecular level, such that each host molecule is part of a complex with a guest molecule. Thus, during the compounding process of a fire retardant thermoplastic compound, the host molecular compounds are advantageously able to resist aggregating with the other host molecular compounds, and the guest molecular compounds are advantageously able to resist aggregating with the other guest molecular compounds. By maintaining an even distribution of host-guest complexes within the compounded resin, the host and guest molecules are able to react rapidly and uniformly with the rest of the flame retardant package throughout the thermoplastic compound, providing enhanced flame retardant performance.

A specific embodiment of the host-guest complex discussed herein utilizes a cyclodextrin as the host carbonific compound and a molybdenum-containing guest molecule as the smoke suppressant. In a further embodiment, the host-guest complex is incorporated into a polyolefin homopolymer or copolymer base resin along with other components of the flame retardant package to create a flame retardant thermoplastic compound. This polymer compound can further contain other intumescent or flame retardant materials, such as metal hydrates, as well as other polymer additives, such as mineral fillers, antioxidants, and UV additives. One particular application for this flame retardant thermoplastic compound is cable jacketing. For instance, the flame retardant thermoplastic material can be extruded as a jacket around a cable core, an optical core, electrical wire, an optical fiber, etc.

The host-guest complex disclosed herein is included as part of an intumescent, flame retardant package. These materials promote char formation as a way to impede the combustion process that occurs during a fire or as a result of intense heat. Intumescent flame retardant systems expand to produce foam, and the foam acts as a char barrier and thermal insulation to prevent further fire and heat damage. Intumescent systems generally consist of an acid donor, a carbonific compound (i.e., a carbon yielding substance), and a spumific agent.

The acid donor can donate an inorganic acid, and thus, in various embodiments, acid donors include, but are not limited to, ammonium polyphosphate, diammonium diphosphate, and/or diammonium pentaborate. Some carbonifics include poly alcohols, such as pentaerythritol, xylitol, mannitol, and d-sorbitol, starch, and polyamide-6. Melamine can be used as a spumific agent as well as ammonium-containing compounds. Additionally, the acid donor and spumific agent can be combined in the same compound, such as ammonium polyphosphate mentioned above.

During combustion the acid donor softens, releasing its acid, which activates the carbon donor. Subsequently, carbonization occurs at about 280° C. between the carbonific and the inorganic acid via both Friedel-Craft reactions and the free radical process to produce [C]x char, or soot. In the last step, a blowing gas is released from the decomposition of the spumific agent. The charring action and the release of blowing gas result in the formation of a foaming char, which stabilizes via crosslinking reactions. This voluminous char acts as a physical barrier that prevents heat and oxygen from transferring through the char to the underlying material. Additionally, the foam blocks the transport of flammable combustion gases from the underlying material to the surface. Thus, by one or more of these mechanisms, a product, such as a cable, may have improved fire resistant characteristics by incorporating one or more of these various flame retardant materials discussed herein.

Despite the formation of a char barrier, sustained smoke release can still occur. Thus, in some embodiments, a smoke suppressant is added to the intumescent mixture. Smoke suppressants can act in a variety of ways. Some simply reduce or suppress the production of smoke, while others prevent the release of smoke. Still others act via crosslinking and modification of the pyrolysis mechanism. For example, some iron(III) compounds promote the formation of stable char and catalyze the oxidation of hydrocarbons in the gas phase. Some zinc compounds, such as zinc borates, act in the condensed phase as general flame retardants. They also promote char formation and act as anti-arcing agents. When heat is applied, the boric oxide content forms a glassy layer which protects underlying layers, while the zinc oxide content causes crosslinking which reduces smoke emission. Zinc borate can be hydrated as well, which allows for the release of water between 290° C. and 415° C.

To create a usable fire retardant compound, the acid donor, carbonific, spumific agent, and smoke suppressant are compounded with a base polymer resin. The resin is selected for suitability for the particular application to which the fire retardant material is going to be used. Upon combining this complex mixture of chemical species, the relatively small size of the components tends to lead to each species aggregating with its own species, limiting the exposure of the species to one another. With decreased access to reactants, the overall chemical reactivity is diminished, thereby reducing the flame retardant effect. High shear mixing may be used to encourage better dispersion (i.e., less aggregation) of the flame retardant additives, but it also risks degrading the base polymer resin. As discussed in more detail below, the host-guest complex of the present disclosure encourages molecular level interaction between the components of the flame retardant compound as opposed to the at best micron-level dispersion that high shear mixing provides.

To facilitate even distribution and to reduce/eliminate the tendency for like components to aggregate, Applicants have developed a flame retardant host-guest complex. For example, a host-guest complex 10 in which the host molecule is a carbonific molecule 12 and the guest molecule is one or more smoke suppressant compounds 14 is shown schematically in FIG. 1. The host-guest complex assures that each carbonific molecule is provided with a smoke suppressant molecule in close physical proximity.

A host-guest complex is comprised of two molecules that are held together by forces other than covalent bonding, which means that the host-guest complex is a physical association, not a chemical reaction. The host molecule has an open structure such that the guest molecule can be inserted into the host molecule. The host and guest are held together through hydrogen bonding, ionic attraction, van der Waals forces, or hydrophobic interactions.

In one embodiment, cyclodextrins act as the host compound. Cyclodextrins are cyclic oligosaccharides. In various embodiments, the cyclodextrins used herein are $\alpha$-, $\beta$- and $\gamma$-cyclodextrin consisting of six, seven, and eight glucopyranose units, respectively. The properties of these cyclodextrins are provided in Table I.

TABLE I

Properties of Selected Cyclodextrins

|  | $\alpha$ | $\beta$ | $\gamma$ |
| --- | --- | --- | --- |
| Molecule weight (g/mol) | 972 | 1135 | 1297 |
| Glucose Monomers | 6 | 7 | 8 |
| Internal cavity diameter (A) | ~5.7 | ~6.3 | ~7.9 |
| Water solubility (g/100 mL, 25° C.) | 14.2 | 18.5 | 23.2 |
| Melting Point (° C.) | ~255 | ~265 | ~245 |
| Cavity volume (mL/mol) | 174 | 262 | 462 |

Figure 2A:
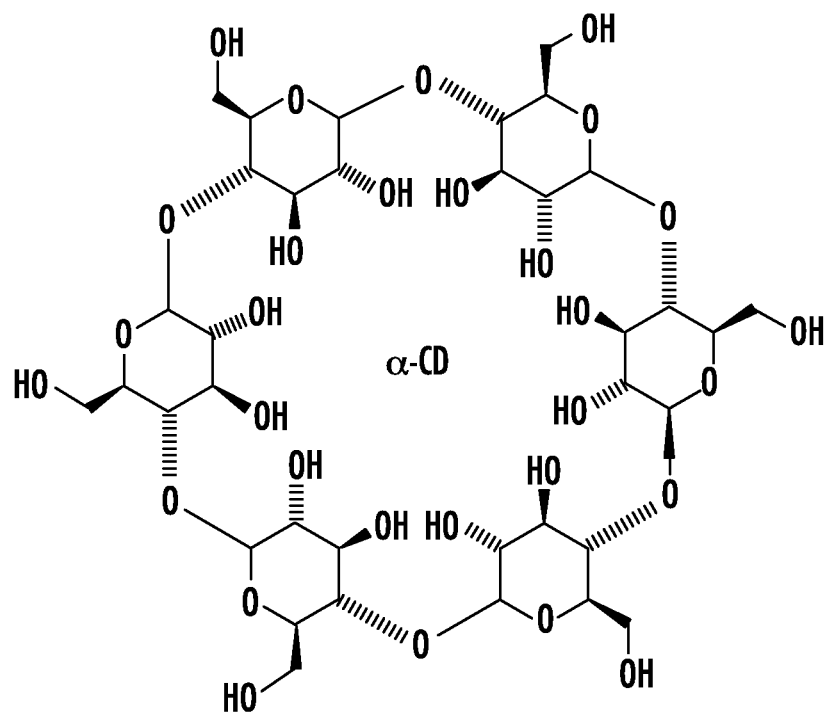
FIGS. 2A-2B depict an α-cyclodextrin host molecule according to an exemplary embodiment.
Figure 2B:
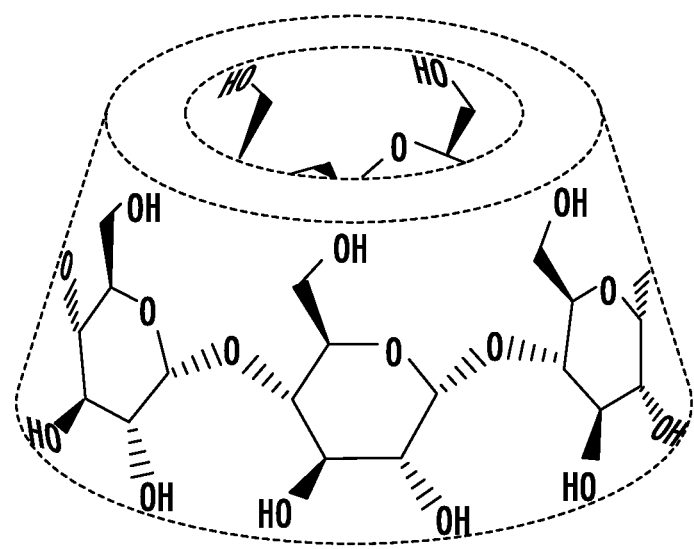
Figure 3A:
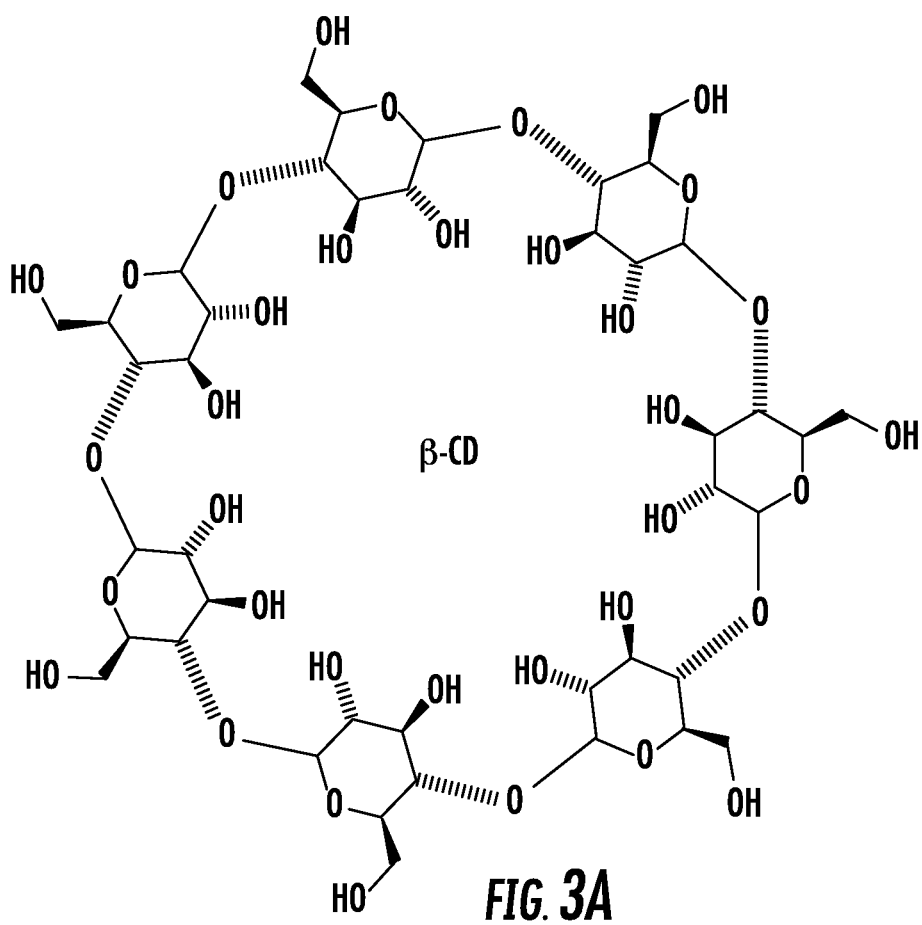
FIGS. 3A-3B depict a β-cyclodextrin host molecule according to an exemplary embodiment.
Figure 3B:
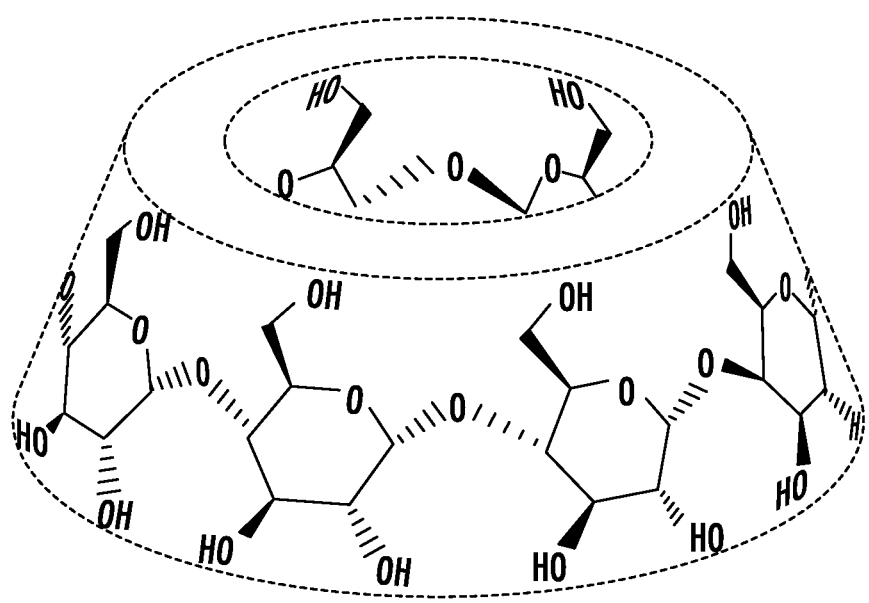
Figure 4A:
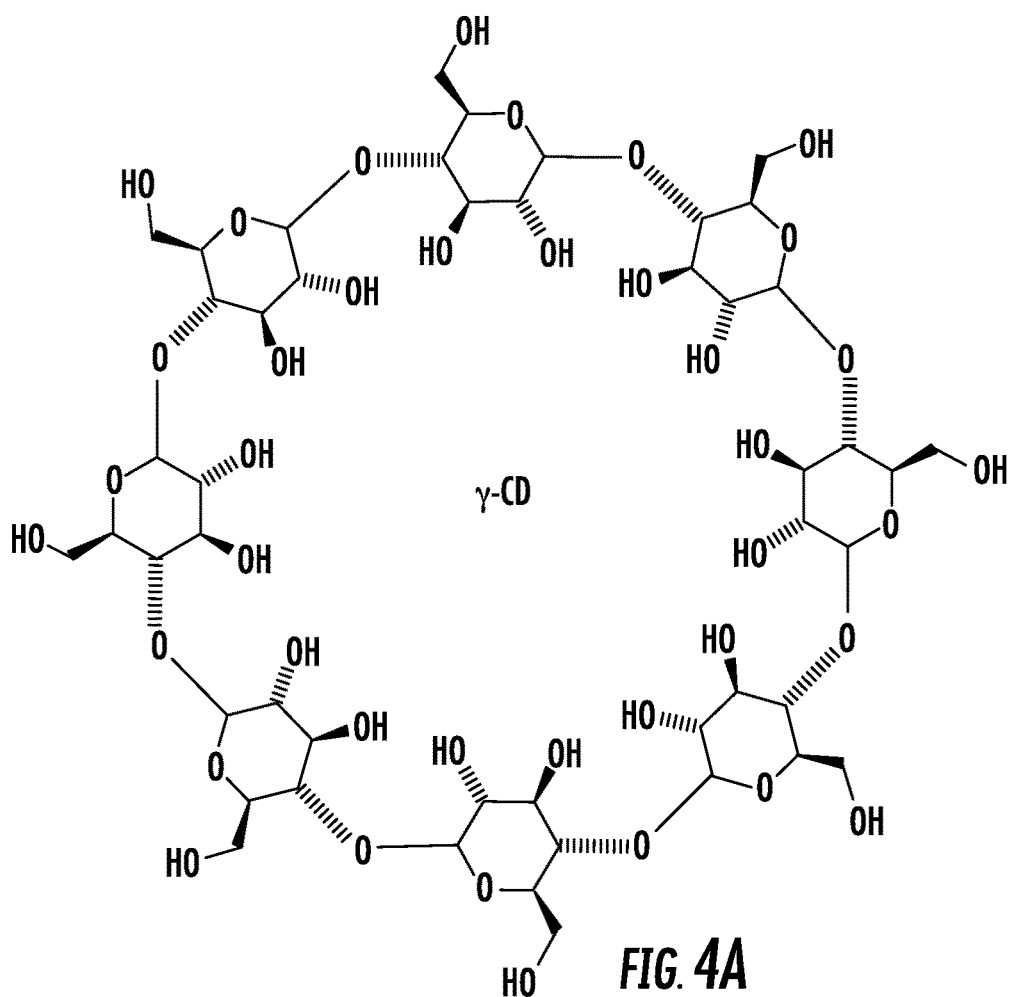
FIGS. 4A-4B depict a γ-cyclodextrin host molecule according to an exemplary embodiment.
Figure 4B:
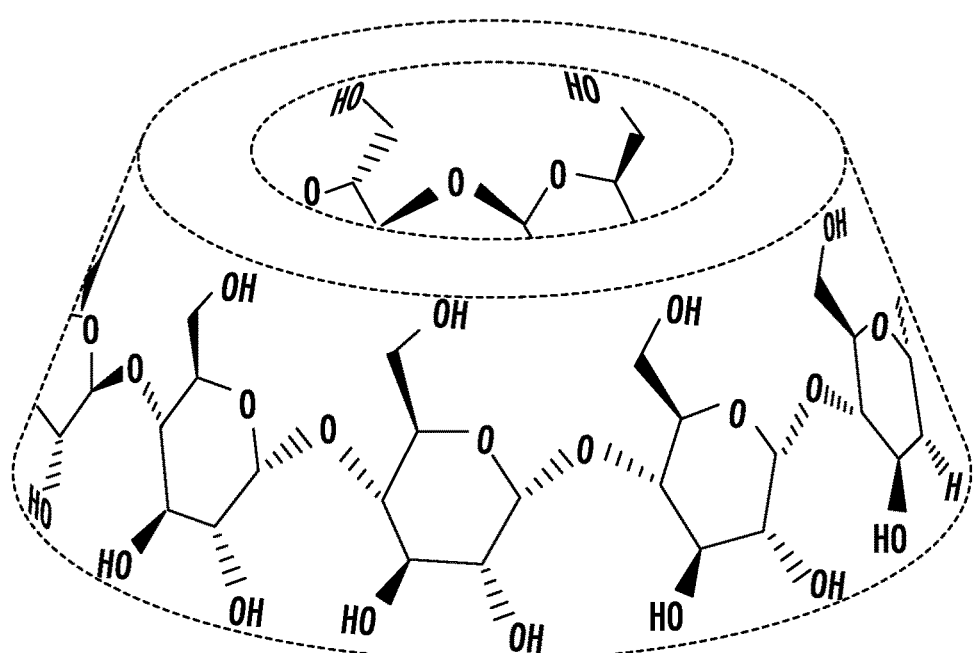

Structurally, a cyclodextrin molecule consists of ($\alpha$-1,4)-linked $\alpha$-D-glucopyranose units. FIG. 2A provides a line angle formula for $\alpha$-cyclodextrin; FIG. 3A provides a line-angle formula for $\beta$-cyclodextrin; and FIG. 4A provides a line-angle formula for $\gamma$-cyclodextrin. Because the glucopyranose units exhibit the chair conformation, each cyclodextrin molecule is shaped like a truncated cone having a central cavity. The truncated cone shape can be seen in FIGS. 2B, 3B, and 4B, which demonstrate that the width of the cone expands as the cyclodextrin molecule grows with additions of glucopyranose units. The central cavity is somewhat lipophilic and hydrophobic, and the outer surface is hydrophilic. The hydroxyl functional groups are orientated to the cone exterior such that the primary hydroxyl groups of the each glucopyranose unit (found at the fifth carbon) are located at the narrow edge of the cone and the secondary hydroxyl groups (located at the second and third carbons of each glucopyranose unit) are located at the wider edge. The central cavity is lined by the skeletal carbons and ethereal oxygens of the glucopyranose units, giving the central cavity of cyclodextrin its lipophilic/hydrophobic character.

The cyclic nature of cyclodextrin allows for other molecules to enter its central cavity. These molecules are referred to as guests. Because of cyclodextrin's hydrophobic central cavity, it will readily form complexes with other hydrophobic guest molecules. Additionally, because cyclodextrin forms a variety of ring sizes, host-guest complexes between cyclodextrin and a variety different size molecules can be created.

While α-, β-, or γ-cyclodextrins are utilized in a preferred embodiment, a variety of other host compounds can also be utilized, such as cyclodextrins larger than γ-cyclodextrins, chemically modified derivatives of the cyclodextrin, such as hydroxypropyl-modified cyclodextrin and methyl-modified cyclodextrin, calixarene (having any number of repeat units), chemically modified derivatives of calixarene, zeolites, chibaite, urea, thiourea, hydroquinone, and Dianin's compound (4-p-hydroxyphenyl-2,2,4-trimethylchroman). Host compounds consisting of urea, thiourea, and hydroquinone form hydrogen-bonded networks that are capable of accommodating guest molecules. Selection of the host compound can be done to alter the polarity of the host-guest complex such that the compound can be tailored to disperse in a variety of media types.

In various embodiments, the guest compound is selected for its smoke suppressant properties. In specific embodiments, the smoke suppressant contains a transition metal, such as molybdenum or zinc. Such transition metal smoke suppressants act via crosslinking and modification of the pyrolysis mechanism to trap smoke or inhibit smoke production.

In particular, molybdenum compounds are thought to act via a reduction reaction with oxygen in the air to produce such molecules as molybdenum dioxide, although the exact reduction compound produced will vary depending on the molybdenum compound used. The molybdenum compounds react in the condensed phase (i.e., the solid or liquid phase) and do not vaporize like other compounds such as antimony trioxide. The reactions in the condensed phase crosslink the polymer to form a dense and stable char. In addition, the formation of volatile aromatic benzene molecules is suppressed. Benzene suppression could result from molybdenum catalytically converting polyenes produced during polymer combustion to trans-isomers that are subsequently converted to carbonaceous char or light aliphatics. These light aliphatics do not form dark heavy smoke. Molybdenum compounds, such as ammonium octamolybdate and molybdenum trioxide, have predominantly been used in PVC materials. An object of the present disclosure is to utilize molybdenum-based smoke suppressants in materials other than PVC, although the disclosed host-guest complex may also be used with PVC based compounds.

Thus, in one embodiment, the guest molecule is a molybdenum-containing compound. Insertion of the guest molecule into the host does not involve a chemical reaction, i.e., no covalent bonds are broken or formed. Instead, the reaction is purely a physical association based on molecular attraction. These complexes prevent aggregation of the individual host and guest species during compounding of a thermoplastic compound because each host compound is already matched with a corresponding guest compound. Therefore, the host and guest compounds will exist in approximately a one-to-one ratio throughout the thermoplastic compound. Additionally, the complexes help to overcome additive insolubility. For instance, a hydrophobic guest molecule can be inserted into a host molecule that has a hydrophobic cavity and a hydrophilic exterior, such as cyclodextrin. The hydrophilic exterior will allow the complex to dissolve in a hydrophilic solvent, thereby facilitating the dissolution of an otherwise insolvent, hydrophobic guest molecule into a hydrophilic solvent.

A variety of molybdenum-containing species may be used as the guest molecule, including, but not limited to, molybdenum trioxide, ammonium octamolybdate, molybdenum acetate [$Mo_2(acetate)_4$], molybdenum dialkyldithiocarbamate, calcium and zinc molybdates, and other organo-molybdenum and/or molybdenum-containing compounds. Additionally, other transition metal compounds can be used as the smoke suppressant compound, including copper(II) compounds, copper(I) compounds, zinc(II) compounds, and aluminum(III) compounds.

The close physical proximity of the host and guest molecules resists/prevents these flame retardant components from separating from each other and forming aggregates in the final compounded resin. Further, the close proximity encourages more rapid reaction kinetics within the compounded plastic material when exposed to heat and/or fire.

While the previously described host-guest complexes will form a char layer on their own, in other embodiments, an acid donor is added to promote additional char formation. In still other embodiments, a spumific agent is added to create an intumescent system. In one embodiment, the acid donor and spumific agent are included as part of the host-guest complex. For instance, a chemically modified cyclodextrin, such as phosphonomethyl-cyclodextrin, can be complexed with a molybdenum-melamine compound, such as Mo(IV)-melamine. In still other embodiments, the host-guest complex, acid donor, and melamine can be two, three, or more separate compounds.

In another aspect, the flame retardant or intumescent system can be compounded with a base polymer to create a thermoplastic flame retardant compound. The thermoplastic flame retardant compound can be deployed through a variety of means, including paints, sprays, dip coatings, jacketing materials, and wrappers.

In various embodiments, the thermoplastic compound is based on a polyolefin homopolymer or copolymer resin. Suitable polyolefin resins include single polymers selected from the following types or a blend of polymers selected from the following types: ethylene-vinyl acetate copolymers, ethylene-acrylate copolymers, polyethylene homopolymers (includes but not limited to low density, medium density, and high density), linear low density polyethylene, very low density polyethylene, polyolefin elastomer copolymer, polypropylene homopolymer, polyethylene-polypropylene copolymer, butene- and octene branched copolymers, or maleic anhydride-grafted versions of the polymers listed above. Again, selection of the polymer depends primarily on the application to which the thermoplastic flame retardant compound is going to be subjected.

In another embodiment, the base resin could be a halogenated thermoplastic (such as polyvinyl chloride), polyamide 6, 6/6, 11, or 12 resins, thermoplastic polyurethane, or a crosslinked polyethylene.

The flame retardant package may contain other flame retardant components, including among others metal hydrates, gas-forming species or combinations of species, and char strength boosters. The compound may also include non-flame retardant additives such as mineral fillers (e.g., talc or calcium carbonate), antioxidants, UV additives, processing modifiers, compatibilizers, and other standard polymer additives.

Various proportions of each component can be used in formulating the thermoplastic compound. In a particular embodiment, the host-guest complex comprises between 5 wt % and 60 wt %, inclusive, of the thermoplastic compound. In another particular embodiment, the entire intumescent flame retardant package comprises between 5 wt % and 60 wt %, inclusive, of the thermoplastic compound. In an even more particular embodiment, the intumescent flame retardant package comprises between 20 wt % and 40 wt %, inclusive, of the thermoplastic compound. Additionally, while the weight percentage of the host-guest complex in the thermoplastic compound will depend, at least to some extent, on the weights of the specific host and guest compounds, the amount of smoke suppressant guest compound can be present in as low a range as between about 1 wt % and about 10 wt %.

The base resin, flame retardant package, and all additives are compounded together using elevated temperatures, such as between about 140° C. and 200° C., and sufficient shear, such as at shear rates between $10\ s^{-1}$ and $10,000\ s^{-1}$, to distribute the components. In a particular embodiment, the shear rate for mixing is between $50\ s^{-1}$ and $500\ s^{-1}$. Sufficient shear mixing can be achieved through use of such mixing equipment as a co-rotating twin screw extruder, a single screw extruder with mixing zones, a Banbury-style rotary mixer, Buss kneader, or another high-shear mixer. Advantageously, the molecular level interaction between the host and guest compounds allows for high shear mixers to be used at a level in which the risk of degradation to the polymer is substantially diminished while still providing excellent dispersion of the flame retardant package.

The flame retardant thermoplastic compound as described herein can be used for a variety of applications. For instance, the thermoplastic compound can be added to wood or steel beams and to the walls of a structure to provide a fire retardant coating.

Figure 6:
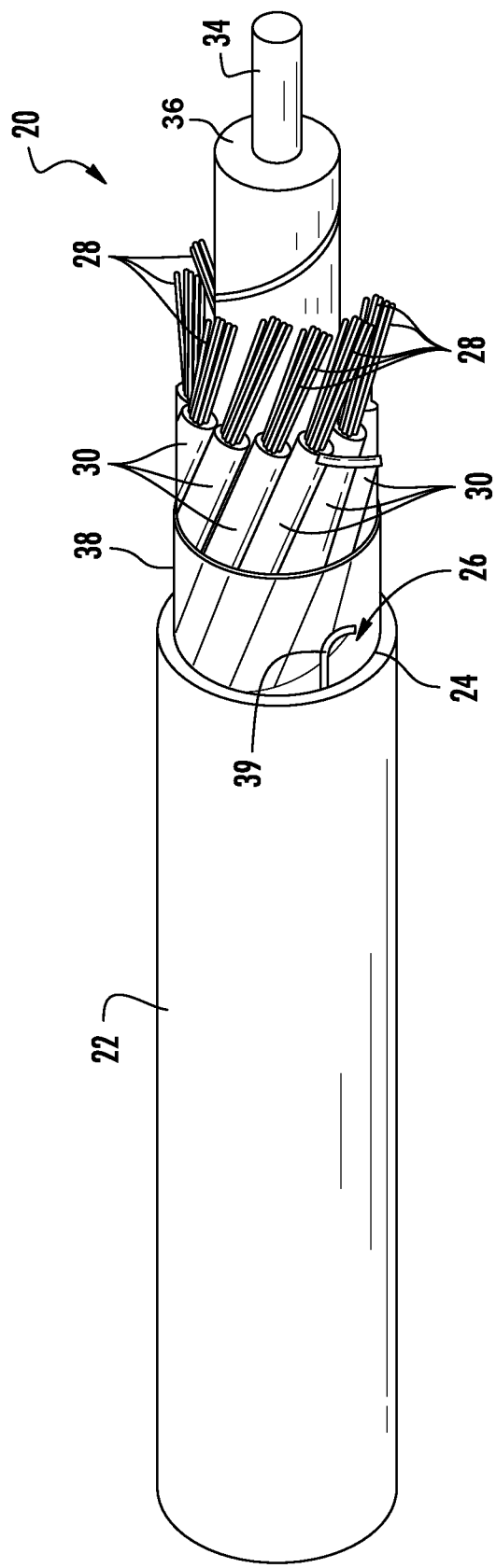
FIG. 6 depicts a cable including a flame retardant material according to an exemplary embodiment.

In a particular embodiment as shown in FIG. 6, the flame retardant thermoplastic compound is used as a jacket for a cable or cable component. The cable shown in FIG. 6 is a fiber optic cable 20. Cable 20 includes a cable body, shown as cable jacket 22, having an inner surface 24 that defines a channel, shown as central bore 26. Pluralities of communication elements, shown as optical fibers 28, are located within bore 26. The cable 20 includes a plurality of core elements located within central bore 26. A first type of core element is an optical transmission core element, and these core elements include bundles of optical fibers 28 that are located within tubes, shown as buffer tubes 30. Buffer tubes 30 are arranged around a central support, shown as central strength member 34. Central strength member 34 includes an outer coating layer 36. A barrier material, such as water barrier 38, is located around the wrapped buffer tubes 30. An easy access structure, shown as rip cord 39, may be located inside cable jacket 22 to facilitate access to buffer tubes 30.

In one embodiment, the flame retardant thermoplastic compound is incorporated into the cable jacket 22 of fiber optic cable 20. In another embodiment, the flame retardant compound is incorporated into the buffer tubes 30 surrounding the bundles of optical fibers 28. In a further embodiment, the flame retardant thermoplastic compound is incorporated into the water barrier 38. By surrounding the cable and cable components with the flame retardant thermoplastic compound, the ability of fire to spread along cable 20 is reduced, and the amount of smoke produced by cable 20 during fire exposure is reduced.

Figure 7:
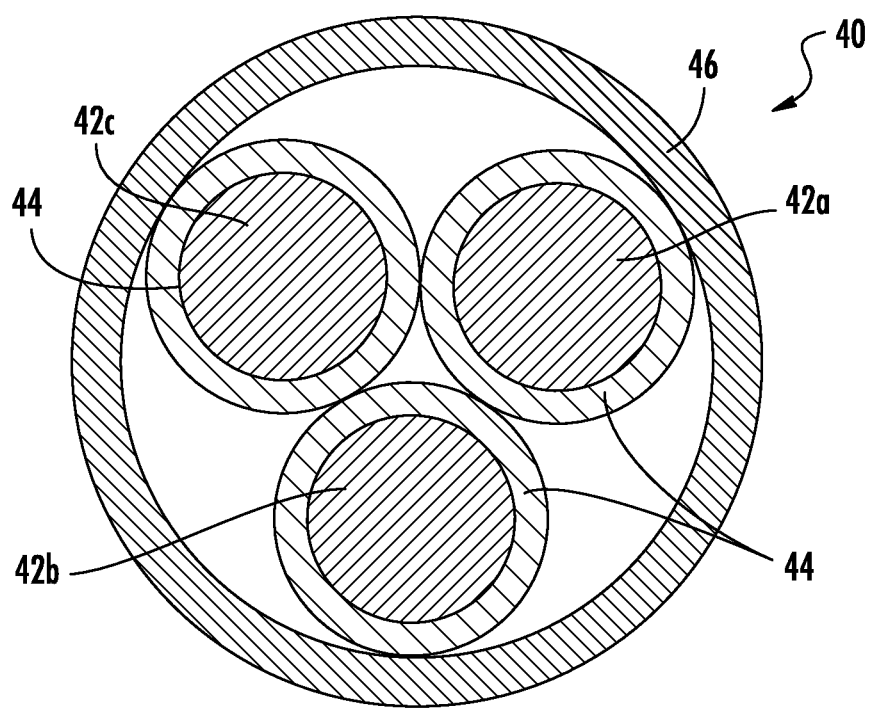
FIG. 7 depicts a cable including a flame retardant material according to another exemplary embodiment.

In another embodiment shown in FIG. 7, the cable is a cable 40, such as might be used for an extension cord, electrical wiring or electrical conduction communication cable. In the specific embodiment shown, the cable 40 includes three inner wires: a hot wire 42a, a neutral wire 42b, and a ground wire 42c. Each wire is surrounded by a wire jacket 44. Surrounding the inner wires may be one or more sheaths and/or filler material (not shown). A cable jacket 46 encompasses the inner wires. The flame retardant thermoplastic compound can be used for any of the wire jackets 44, the cable jacket 46, or both.

Advantageously, these host-guest complexes allow for the more efficient and effective use of flame retardant compounds. For instance, the higher utilization of the flame retardant components as a result of decreased aggregation decreases the amount of flame retardant material that is necessary to achieve a given flame retardant performance. Accordingly, raw material costs are reduced. Alternatively, the same amount of fire retardant material could be used while increasing the flame retardant performance, which would improve the burn performance rating.

EXAMPLE

Figure 5:
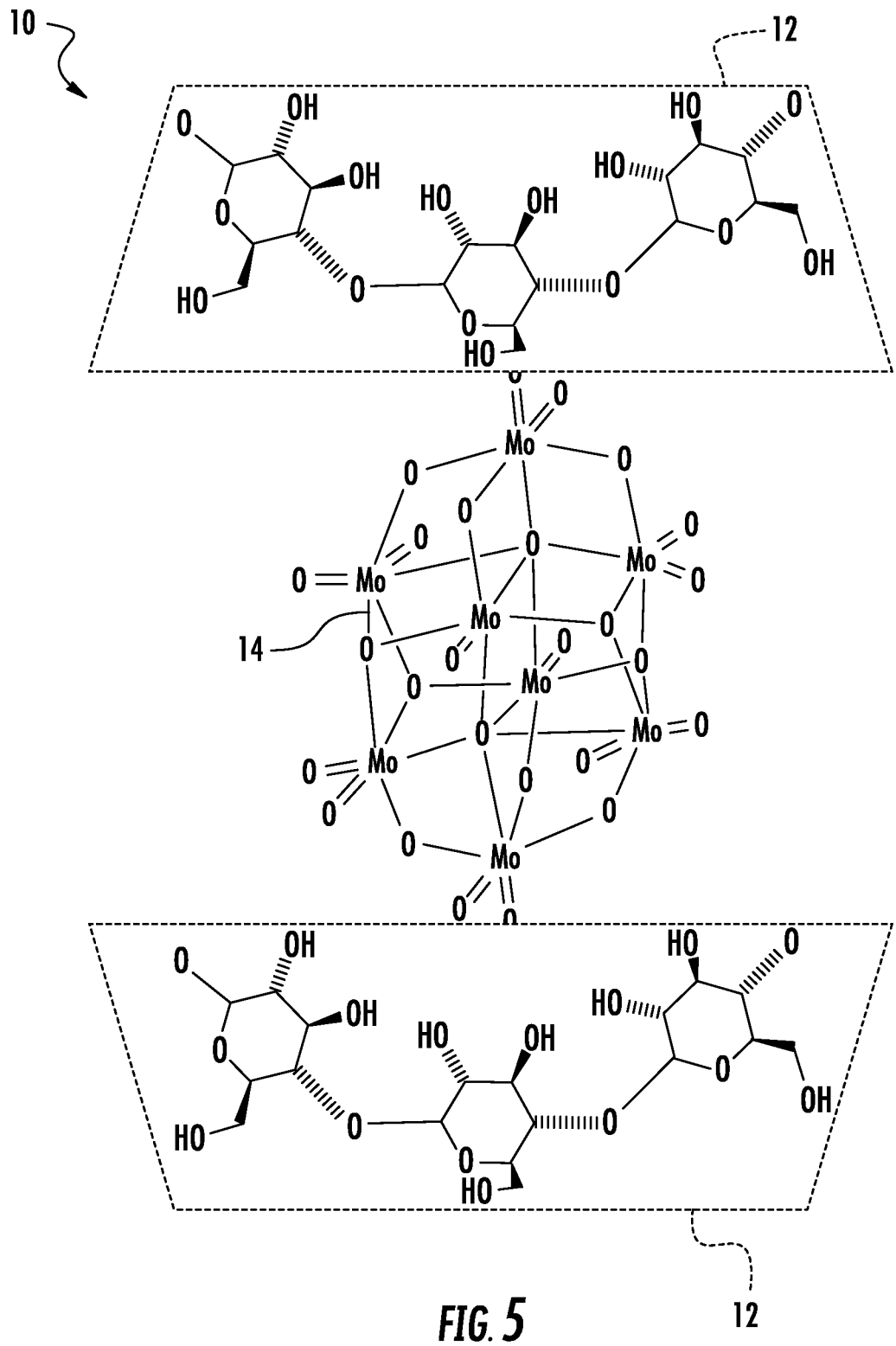
FIG. 5 depicts a β-cyclodextrin and octamolybdate host-guest complex according to an exemplary embodiment.

FIG. 5 provides example crystalline structures for a β-cyclodextrin host-guest complex with ammonium octamolybdate. The host-guest complex was formed by dissolving β-cyclodextrin in water until a saturated solution was formed. The ammonium octamolybdate was dissolved in ethanol, and the mixture was slowly added to the saturated β-cyclodextrin mixture. The combined mixture was allowed to sit for a time until visible β-cyclodextrin crystals began to form. The solvent was removed, leaving a solid, crystalline powder of β-cyclodextrin and octamolybdate host-guest complexes.

Approximately 5 wt % of the host-guest complex powder was compounded with an acid donor, spumific agent, and the balance was a blend of ethylene-vinyl acetate (EVA) copolymer, linear low density polyethylene (LLDPE) base resin, and typical additives. Compounding was performed at a temperature of 140 to 180° C. on a standard twin screw extruder configuration.

After compounding, the flame retardant thermoplastic compound was extruded as an outer jacket for an optical communication cable. The jacket's thickness was 1 mm. The cable consisted of inner core containing 12 loose buffered fibers stranded in a common "loose tube" configuration.

The inventors envision that the flame retardant thermoplastic compound discussed above will meet certain flame retardant standards, such as cone calorimeter reaction-to-fire test ISO 5660; limiting oxygen index (LOI) test ISO 4589; single cable test IEC 60332-1-2; vertical multi cable test DIN 50399/IEC 60332-3-24; and in smoke density chamber IEC 61034.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed:

1. An intumescent flame retardant compound comprising:
   a base resin;
   an acid donor;
   a spumific agent;
   a cyclodextrin host compound; and
   a guest compound including at least one atom of molybdenum, wherein the cyclodextrin host compound and the guest compound form a host-guest complex, wherein the acid donor reacts with the carbonific host compound to produce a char when exposed to a temperature above 280° C., wherein the spumific agent decomposes to form a blowing gas when exposed to a temperature above 280° C., and wherein the blowing gas and the char form a foam.

2. The intumescent flame retardant compound of claim 1, wherein the cyclodextrin host compound is selected from the group consisting of alpha, beta, gamma, and larger cyclodextrin and combinations thereof.

3. The intumescent flame retardant compound of claim 2, wherein the molybdenum-containing compound is selected from the group consisting of molybdenum trioxide, ammonium octamolybdate, molybdenum acetate, calcium molydate, zinc, molybdate, molybdenum dialkyldithiocarbamate, and combinations thereof.

4. The intumescent flame retardant compound of claim 3, wherein the base resin includes a polyolefin homopolymer or copolymer.

5. The intumescent flame retardant compound of claim 1, wherein the intumescent flame retardant compound is a component of a jacket that surrounds an electrical communication component or an optical communication component.

6. The intumescent flame retardant compound of claim 5, wherein the jacket further comprises at least one polymer additive selected from the group consisting of mineral fillers, antioxidants, UV additives, processing modifiers, compatibilizers, and combinations thereof.

* * * * *

UNITED STATES PATENT AND TRADEMARK OFFICE
CERTIFICATE OF CORRECTION

PATENT NO. : 10,538,653 B2
APPLICATION NO. : 16/553992
DATED : January 21, 2020
INVENTOR(S) : Dayue Jiang et al.

Page 1 of 1

It is certified that error appears in the above-identified patent and that said Letters Patent is hereby corrected as shown below:

In the Specification

In Column 1, Line 8, delete "Oct. 19, 2016," and insert -- May 18, 2018, --, therefor.

In Column 1, Line 10, delete "Feb. 25, 2016," and insert -- Oct. 19, 2016, --, therefor.

In Column 1, Line 11, delete "Nov. 11, 2015," and insert -- Nov. 18, 2015, --, therefor.

In the Claims

In Column 10, Lines 4-5, Claim 3, delete "molydate" and insert -- molybdate --, therefor.

Signed and Sealed this
Seventeenth Day of March, 2020

Andrei Iancu
*Director of the United States Patent and Trademark Office*